United States Patent [19]

Roethler

[11] 4,136,903

[45] Jan. 30, 1979

[54] TIRE LIFTING APPARATUS

[76] Inventor: Kenneth W. Roethler, Box 6, Larrabee, Iowa 51029

[21] Appl. No.: 796,939

[22] Filed: May 16, 1977

[51] Int. Cl.[2] .......... B66C 1/28

[52] U.S. Cl. .......... 294/81 R; 294/95; 294/97

[58] Field of Search .......... 294/81 R, 81 SF, 93, 294/95, 97, 67, 88; 214/330, 333; 264/315; 211/24, 23

[56] References Cited

U.S. PATENT DOCUMENTS

| | | | |
|---|---|---|---|
| 1,277,716 | 9/1918 | Grosvenor | 294/95 |
| 3,010,751 | 11/1961 | Day et al. | 294/81 R |
| 3,393,807 | 7/1968 | Sylvester et al. | 294/97 |

*Primary Examiner*—James B. Marbert

*Attorney, Agent, or Firm*—Henderson, Sturm, Cepican & Fix

[57] ABSTRACT

An apparatus for use in the lifting of tires that includes a master support sleeve, two movable arms slideably associated with the master support sleeve, and two hook units pivotably connected to the arms for easy engagement with the inner rim of a tire.

5 Claims, 3 Drawing Figures

TIRE LIFTING APPARATUS

BACKGROUND OF THE INVENTION

Since the advent of the wheel, man has applied that structure in an incalculable variety of manner and use. One such use was the development of the inflatable tire, which tire could be used with great success in association with the automobile, trucks, tractors and great earth-moving equipment. Such tires range in size from the smallest to those weighing over four hundred pounds. Since such tires currently exist as interchangeable commodities, and since the tires may not be expected to last indefinitely, a problem arises concerning the movement of the tires from one place to another, in their own right. At times, this problem is preceded by the concern of even getting the tire off the ground. This problem becomes particularly acute with respect to farmers and the like who may own hoisting equipment but cannot afford a large capital outlay in order to possess a device whose sole use is to lift large tractor tires. It has also been observed that when a tire from a tractor or earth moving equipment needs replacement or repair in the field, many tire repair companies lack a device which readily engages a tire and in combination with a crane readily moves it and positions it.

SUMMARY OF THE INVENTION

Therefore, a primary object of this invention is to provide an apparatus for use in the lifting of a tire.

Another object of this invention is to provide an apparatus for use in the lifting of tires that easily adjust to accomodate a wide variety of different sized tires.

It is another object of this invention to provide an apparatus for use in the lifting of tires that may be successfully used in harmony with existing hoisting and lifting means.

A further object of this invention is the provision of an apparatus for use in the lifting of tires that is lightweight, yet capable of lifting heavy tires.

It is a still further object of this invention to provide an apparatus for use in the lifting of tires that is inexpensive to manufacture, durable of construction, and highly effective in use.

These and other objects are realized by an apparatus for use in the lifting of tires that includes a master support sleeve, two movable arms slideably associated with the master support sleeve, and two hook units pivotally connected to the arms.

BRIEF DESCRIPTION OF THE DRAWINGS

The objects heretofore set forth and others will become more readily apparent when taken upon reference to the following description, and especially when taken in conjunction with the appended drawings, described briefly as follows.

DESCRIPTION OF THE PREFERRED EMBODIMENTS

Figure 1:
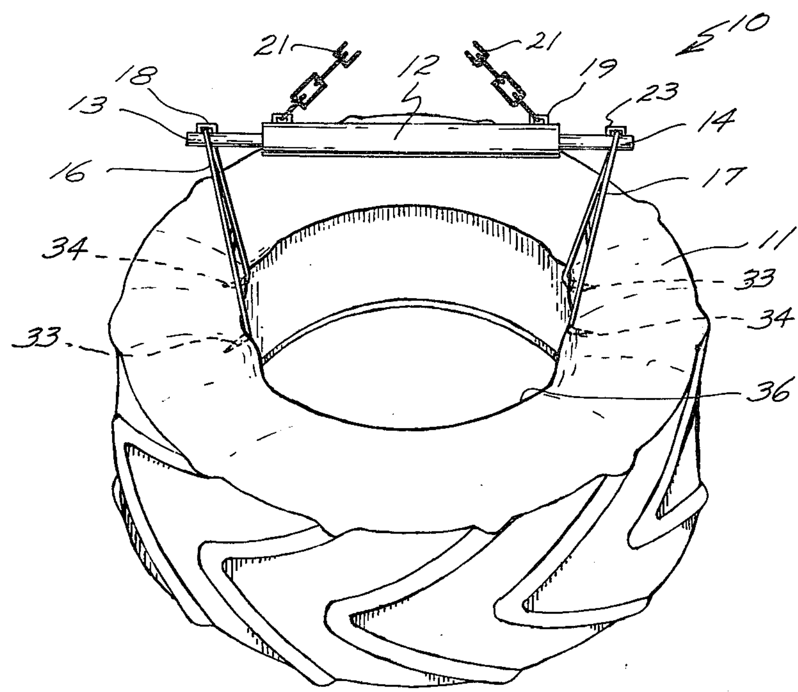
FIG. 1 is a front perspective view of the apparatus in use.

Referring now to the drawings, the tire lifting apparatus of the invention is depicted generally by the numeral 10 in FIG. 1, wherein the apparatus is supporting a tire 11. The apparatus 10 includes a master support sleeve 12, a pair of movable arms 13 and 14 telescopically mounted in said sleeve, and a pair of hook units 16 and 17 pivotally connected to the arms 13 and 14 and depending therefrom.

Figure 2:
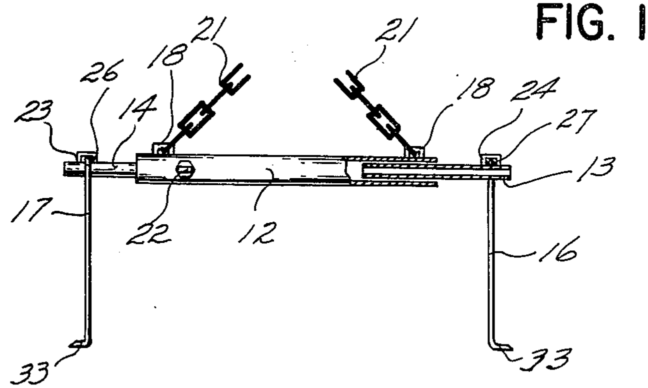
FIG. 2 is a front, partially sectioned elevational view thereof.
Figure 3:
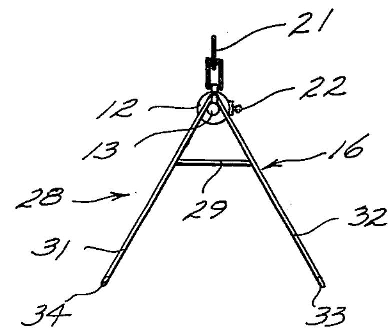
FIG. 3 is a side elevational view thereof.

The master support sleeve 12 (FIGS. 1 and 2) is formed from an elongated tube, i.e. an iron pipe, and has a pair of loops 18 and 19 secured, one on each end, to the upper surface thereof. The loops are provided to permit the attachment of a chain 21, or the like, to the sleeve. The chain is then connectable to a hoist (not shown) or the like for the purpose of lifting the sleeve. Referring to FIGS. 2 and 3, there is depicted a set screw 22, which is threadably mounted in a tapped hole (not shown) in the side of the sleeve 12 proximate one end thereof. Although only one set screw 22 is depicted, there are a pair with the second one mounted on the other end of the sleeve.

Telescopically mounted in each end of the sleeve 12 are the movable arms 13 or 14 (FIG. 1 and 2). The outside diameter of each arm is smaller than the inside diameter of the sleeve. The arms are coaxial wherein the outer end of each projecting axially of the sleeve. The set screws 22 are provided to lock each arm in any predetermined position within the sleeve. A U-shaped member 23 or 24 is secured to the top surface of each arm 13 and 14 proximate its outer end, with the free ends of each member secured to the arm thus forming a closed loop which is longitudinally disposed on the arm.

Pivotally disposed in each closed loop is the apex 26 or 27 (FIGS. 1 and 2) of the hook units 16 and 17. Each hook unit 16 or 17 includes a V-shaped member 28, a cross brace 29 interconnecting legs 31 and 32 of the member, and a pair of hooks 33 and 34. The hooks are secured to and project perpendicularly of the free ends of the legs 31 and 32. The diameter of the apex 26 or 27 of the member 28 is smaller than the inside diameter of the closed loop of the U-shaped member, thus permitting the lower or hook ends of the V-shaped member to swing freely.

With the preceding disclosure in mind, the operation of the apparatus is now described as follows. The apparatus 10 is held suspended over the tire 11. The movable arms 13 and 14 are allowed to slide freely within the master sleeve 12. The The hooks 33 and 34 of the hook units 16 and 17 are moved to engage the inner rim 36 of the tire 11 by extending the movable arms 13 and 14 outwardly. When the tire 11 is sufficiently engaged, the set screws 2 are tightened to lock the movable arms 13 and 14 in place. This being completed, the tire 11 may now be lifted by whatever hoisting means is deemed suitable by the operator. To release the tire 11, the set screws 22 need only be loosened and the movable arms 13 and 14 retracted into the sleeve 12 until the hooks 33 and 34 are disengaged.

It should be understood that the above disclosure describes only one possible embodiment of the invention, and that other materials and designs will readily occur to those skilled in the art without departing from the auspices of the inventive penumbra disclosed herein.

I claim:

1. A tire lifting apparatus for use in the lifting of a tire by the inner rim comprising:

- a master support sleeve, said sleeve having a hole formed longitudinally therethrough;
- first and second movable arms movably secured to said master support sleeve, said first and second movable arms being telescopically disposed in said hole with said arms projecting coaxially from opposite ends of said sleeve; and first and second hook units secured to said first and second movable arms, respectively, for engaging the inner rim.

2. A tire lifting apparatus for use in the lifting of a tire by the inner rim as described in claim 1 and including a locking means operatively connected to said sleeve for preventing said first and second arms from moving with respect to said sleeve.

3. A tire lifting apparatus for use in the lifting of a tire by the inner rim as described in claim 2 wherein said first and second hook units includes a depending member pivotally secured at an upper end thereof to said first and second arms, respectively, and having a tire engaging hook secured to a lower end thereof.

4. A tire lifting apparatus for use in the lifting of a tire by the inner rim as described in claim 3 wherein said depending member is V-shaped having an apex and a pair of free ends, said apex disposed over one of said arms with the free ends depending therefrom, said free ends each having a hook secured thereto and projecting generally perpendicular thereto, and each arm has a U-shaped member secured thereto for forming a loop in which said apex is disposed.

5. A tire lifting apparatus for use in the lifting of a tire by the inner rim as described in claim 4 and sleeve includes a pair of spaced loops secured thereto for receiving a lifting unit.

* * * * *

UNITED STATES PATENT AND TRADEMARK OFFICE
CERTIFICATE OF CORRECTION

PATENT NO. : 4,136,903

DATED : January 30, 1979

INVENTOR(S) : Kenneth W. Roethler

It is certified that error appears in the above-identified patent and that said Letters Patent are hereby corrected as shown below:

Column 2, line 49, cancel beginning with "set screws 2" and insert --set screws 22--.

Signed and Sealed this

*Fifth* Day of *June 1979*

[SEAL]

*Attest:*

RUTH C. MASON
*Attesting Officer*

DONALD W. BANNER
*Commissioner of Patents and Trademarks*